(12) United States Patent
Ono

(10) Patent No.: US 8,708,544 B2
(45) Date of Patent: Apr. 29, 2014

(54) LIGHT SOURCE UNIT AND DEVICE USING SAME

(75) Inventor: Shinichirou Ono, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 145 days.

(21) Appl. No.: 13/357,207

(22) Filed: Jan. 24, 2012

(65) Prior Publication Data

US 2012/0187426 A1 Jul. 26, 2012

(30) Foreign Application Priority Data

Jan. 26, 2011 (JP) .................................. 2011-014145

(51) Int. Cl.
*F21V 7/04* (2006.01)

(52) U.S. Cl.
USPC ................. 362/631; 362/249.02; 362/249.11; 362/646

(58) Field of Classification Search
USPC ........ 362/249.02, 249.11, 631, 646; 439/571, 439/574, 575
See application file for complete search history.

(56) References Cited

U.S. PATENT DOCUMENTS

| | | | |
|---|---|---|---|
| 7,201,531 B2* | 4/2007 | Shackelford et al. | 404/6 |
| 8,059,226 B2* | 11/2011 | Chang et al. | 349/58 |
| 8,142,065 B2* | 3/2012 | Cho et al. | 362/646 |
| 2012/0105763 A1* | 5/2012 | Takeuchi et al. | 349/61 |
| 2012/0120633 A1* | 5/2012 | Hillman et al. | 362/97.3 |

FOREIGN PATENT DOCUMENTS

| | | |
|---|---|---|
| JP | 2007-128820 A | 5/2007 |
| JP | 2007-311327 A | 11/2007 |
| JP | 2008-218039 A | 9/2008 |
| JP | 2009-238727 A | 10/2009 |

* cited by examiner

*Primary Examiner* — John A Ward
(74) *Attorney, Agent, or Firm* — Sughrue Mion, PLLC

(57) ABSTRACT

Provided is a light source unit in which locating components are mounted on a substrate together with LEDs forming a light emitting portion, and with this, the light source unit can be more easily replaced, and the number of components can be reduced.

14 Claims, 7 Drawing Sheets

LIGHT SOURCE UNIT AND DEVICE USING SAME

This application is based upon and claims the benefit of priority from Japanese Patent Application No. 2011-014145, filed on Jan. 26, 2011, the disclosure of which is incorporated herein its entirety by reference.

BACKGROUND OF THE INVENTION

1. Field of the Invention

This invention relates to a light source unit and a device provided with the same in which light emitting diodes (hereinafter, abbreviated as LEDs) are used as light sources, and more specifically, to an illumination device and a liquid crystal display device provided with the same.

2. Description of the Related Art

In general, illumination devices using point light sources (for example, LEDs) as light sources and liquid crystal display devices using the illumination devices tend to be widely used. In the following, description is made mainly of the liquid crystal display device and the illumination device therefor, but this invention is not limited to the liquid crystal display device.

The liquid crystal display device normally includes a liquid crystal panel and an illumination device (backlight unit) on a rear surface side of the liquid crystal panel. The illumination device for the liquid crystal display device includes, as a light source, a light source unit including a plurality of LEDs arrayed in a line on a wired substrate, and a light guide unit including a light guide plate which propagates light from the LEDs while reflecting the same with inner surfaces thereof. In this context, the light guide unit includes a saw-toothed or prismatic reflecting surface provided on an exit surface of the light guide plate, and a reflective sheet provided on a rear surface of the light guide plate. With this structure, the light from the LEDs is efficiently guided to the liquid crystal panel provided in an upper portion of the light guide unit.

In consideration of long-term use of the liquid crystal display device, it is desired to employ a structure which allows a light source unit using LEDs as light sources to be replaced.

As the liquid crystal display device, there have been proposed various types of liquid crystal display devices. For example, Japanese Laid-Open Patent Application Publication (JP-A) No. 2007-128820 proposes a liquid crystal display device in which a circuit substrate implemented with LEDs is mounted as a light source unit onto an illumination device. In the liquid crystal display device disclosed in JP-A 2007-128820, the circuit substrate provided to the illumination device is sandwiched by a chassis and a back case, and the circuit substrate is fixed to the back case with a double-faced tape. Further, a partially-thinned reflective sheet is inserted into a part at which a light guide plate and the circuit substrate overlap each other. Still further, the chassis, the back case, and the circuit substrate are fixed to each other with double-faced tapes.

In this structure, the part of the reflective sheet is thinned correspondingly to the part at which the light guide plate and the substrate overlap each other. Thus, a shift amount in a thickness direction of centers of light emitting surfaces of the LEDs and a center of a light incident surface of the light guide plate with respect to each other is reduced. As a result, light incident efficiency is enhanced in comparison with that in a case of using a normal reflective sheet having a uniform thickness, and hence luminance is enhanced. However, the chassis, the back case, and the circuit substrate are fixed to each other with the double-faced tapes, and hence it is difficult to replace the light source unit including the LEDs. In other words, in JP-A 2007-128820, replacement of the light source unit is not totally taken into consideration.

Meanwhile, Japanese Laid-Open Patent Application Publication (JP-A) No. 2007-311327 proposes a liquid crystal display device in which a light source substrate can be inserted through an insertion-and-removal hole formed through side surfaces of an upper case and a lower case. Further, through-holes are formed through a surface opposite to an exit surface of the lower case. In this structure, in order to fit a light source substrate, the light source substrate is inserted from the insertion-and-removal hole, and then a substrate holding member is fitted in a manner of being inserted into the through-holes of the lower case. In this way, the light source substrate and a side surface portion of the lower case can be held in a state of being sandwiched by an elastic force of the substrate holding member.

Further, Japanese Laid-Open Patent Application Publication (JP-A) No. 2008-218039 proposes an illumination device, in other words, a backlight unit in which a substrate implemented with LED light sources can be easily replaced. Specifically, the illumination device disclosed in JP-A 2008-218039 includes the substrate implemented with the LED light sources, a case for fixing the substrate, a substrate insertion-and-removal hole for freely inserting and removing the substrate with respect to the case, and a stopper for fixing the substrate in the case. In other words, the case is provided with a substrate insertion hole for implementation of the LED light sources and a hole through which the stopper can be inserted, the substrate insertion hole being closed by inserting the stopper.

In this structure, the substrate is inserted into the case, and then the stopper is inserted, with the result that the LEDs on the substrate hook onto the stopper. In this way, the substrate is fixed in the case.

Japanese Laid-Open Patent Application Publication (JP-A) No. 2009-238727 discloses a light source unit and a liquid crystal display device, in which, as illustrated in FIG. 10, a wired substrate 90 implemented with LEDs 80 is fitted to an LED cover 100 having a U-shaped cross-section. In this structure, a light guide plate is sandwiched from above and below by the LED cover 100.

In this structure, the LED cover 100 sandwiches the light guide plate from above and below. Thus, the LEDs and the light incident surface of the light guide plate are positioned in the thickness direction with respect to each other. In addition, the LED cover 100 is not bonded to other members, which leads to an advantage that the light source unit can be easily replaced.

In this context, when the LEDs and the light guide plate shift from each other in the thickness direction, a center of a light incident surface of the light guide plate and light emitting surfaces of the LEDs shift from each other. Thus, light incident efficiency is deteriorated. In JP-A 2007-128820, in order to prevent the shifts, the light source unit is fixed to the substrate with the double-faced tapes and the like. However, when the light source unit is fixed with the double-faced tapes in this way, it is difficult to replace the light source unit.

Meanwhile, as disclosed in JP-A 2007-311327, when the substrate holding member is used for holding and fixing the light source substrate, the light source substrate is positioned with respect to the upper case. Thus, the light incident surface of the light guide plate and the light emitting surfaces of the LEDs largely deviate in position from each other.

Further, as disclosed in JP-A 2008-218039, when the stopper is used for holding and fixing the substrate, the substrate is positioned with respect to the case. Thus, the light incident surface of the light guide plate and the light emitting surfaces of the LEDs largely deviate in position from each other. In addition, use of the stopper for holding the substrate leads to disadvantages that insertion of the stopper into the backlight unit involves time and efforts and a manufacturing cost increases.

Still further, as disclosed in JP-A 2009-238727, when the LED cover is fitted (refer to FIG. 10), the LEDs and the light guide plate are positioned with respect to each other in the thickness direction, and the light source unit can be easily replaced. However, disadvantageously, it is necessary to provide the LED cover in addition to the wired substrate. In other words, in order to assemble the light source unit, two steps are required: implementing the LEDs on the wired substrate; and after that, fitting the LED cover to the wired substrate, which leads to deterioration of assembly workability and an increase in manufacturing cost.

SUMMARY OF THE INVENTION

An exemplary object of the invention is to provide a light source unit which is more easily replaced and contributes to cost reduction, and a device provided with the same.

It is another exemplary object of this invention to provide a light source unit which contributes to much higher workability, and a device provided with the same.

According to a first exemplary aspect of this invention, there is provided a light source unit, including: a substrate; a light emitting portion mounted on a surface of the substrate and to be used as a light source; and a locating component formed on the substrate and to be used for locating the light emitting portion, the light emitting portion and the locating component being mounted on the same substrate.

According to a second exemplary aspect of this invention, there is provided a light source unit, further including a reflective member for reflecting light from the light emitting portion, the reflective member being provided on the substrate.

According to a third exemplary aspect of this invention, there is provided a light source unit, in which the light emitting portion includes a plurality of LEDs arranged in a line at intervals from each other in a longitudinal direction of the substrate, and in which the locating component includes a plurality of locating fittings arranged in the same line as the line formed of the plurality of LEDs.

According to a fourth exemplary aspect of this invention, there is provided a light source unit, in which the light emitting portion includes a plurality of LEDs arranged in a line at intervals from each other in a longitudinal direction of the substrate, and in which the locating component includes a protruding portion provided integrally with each of the plurality of LEDs.

According to a fifth exemplary aspect of this invention, there is provided a light source unit, in which the light emitting portion includes a plurality of LEDs arranged in a line at intervals from each other in a longitudinal direction of the substrate, and in which the locating component is fitted integrally with each of the plurality of LEDs.

According to the exemplary embodiment of the invention, it is possible to obtain a light source unit that can simultaneously achieve advantages of being easily replaced and easily assembled, and an illumination device and/or a liquid crystal display device provided with the same. Further, according to the exemplary embodiment of the invention, when the light source unit is used as a light source for a liquid crystal display device, the light source unit can simultaneously achieve advantages of being easily replaced and reducing manufacturing cost. Still further, the exemplary embodiment of the invention is advantageous not only in that the light source unit can be easily replaced but also in that the light source and the light guide plate can be positioned with high accuracy.

DESCRIPTION OF EXEMPLARY EMBODIMENTS

In the following, description is made of exemplary embodiments with reference to the drawings.

First Embodiment

Figure 1:
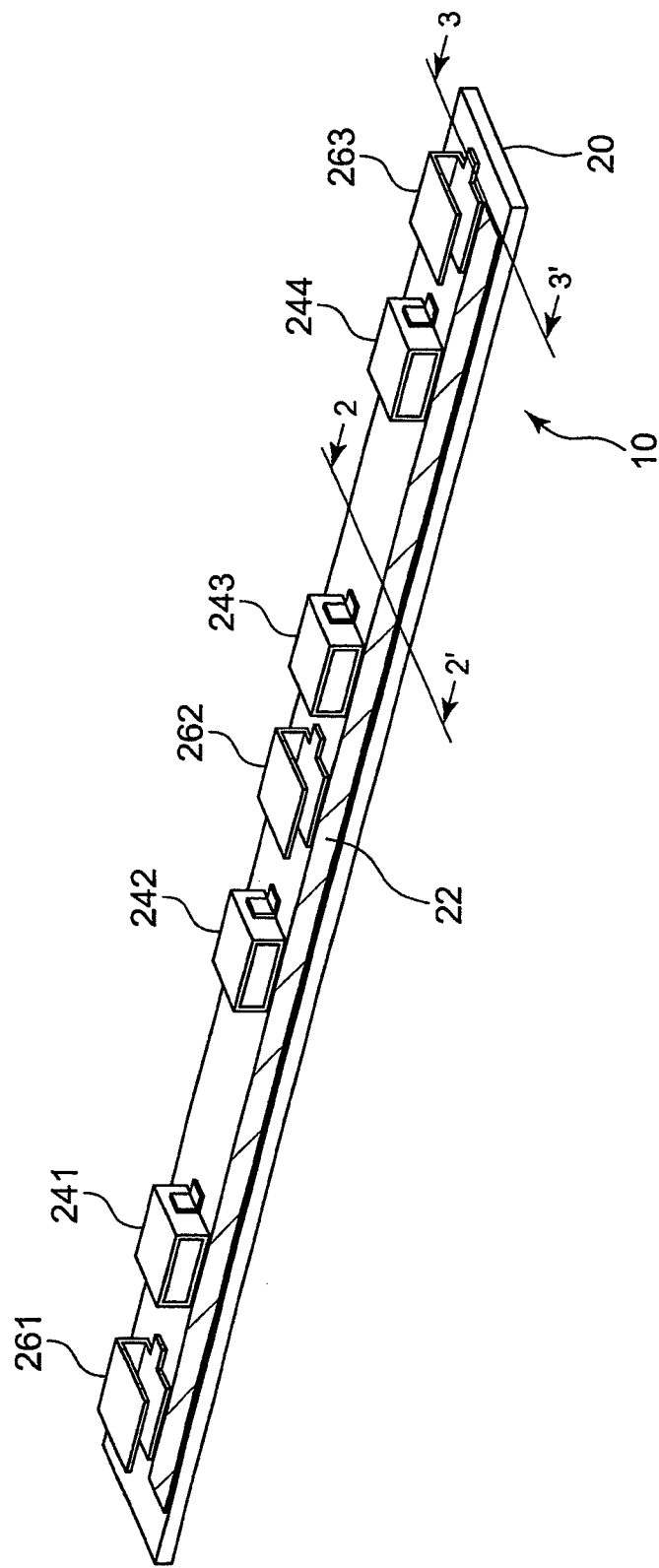
FIG. 1 is a perspective view of a light source unit according to a first embodiment of this invention.

FIG. 1 illustrates a light source unit 10 according to a first embodiment of this invention. The illustrated light source unit 10 includes a rectangular substrate 20 on which wiring (not shown) is formed, a reflective tape 22 arranged along one side in a longitudinal direction of the substrate 20, and a plurality of LEDs 241 to 244 (in this case, four LEDs) arrayed in a line at intervals from each other. Those LEDs 241 to 244 form a light emitting portion. Each of the illustrated LEDs 241 to 244 has a rectangular-parallelepiped shape and a light emitting surface arranged to face the reflective tape 22 side adjacently to the reflective tape 22. A bottom surface of each of the LEDs 241 to 244 is mounted on the substrate 20, and side surfaces thereof are implemented and fixed to the substrate 20 by soldering or the like. Further, the LEDs 241 to 244 are electrically connected to the wiring on the substrate 20.

Further, the light source unit 10 includes locating components for locating the LEDs 241 to 244 with respect to a light guide member (specifically, light guide plate) installed in an illumination device of a liquid crystal display device. The illustrated locating components include two locating fittings 261 and 263 respectively arranged on longitudinal outer sides with respect to the LEDs 241 and 244 at both ends of the LEDs 241 to 244 arrayed in a line, and another locating fitting 262 arranged between the LEDs 242 and 243.

Here, by being formed in accordance with solder implementation patterns for general electric components, the locating fittings 261 to 263 can be implemented by an automatic implementing machine as well as the general electric components. Actually, in order to manufacture the light source unit 10 illustrated in FIG. 1, the LEDs 241 to 244 and the locating fittings 261 to 263 are implemented, and then the reflective tape 22 is applied on the substrate 20 at an overlapping point of the substrate 20 and the light guide plate. Note that, when the substrate 20 can be downsized and hence an overlapping amount with the light guide plate is small, it is not necessary to apply the reflective tape 22 and hence the number of components can be reduced. Note that, the LEDs 241 to 244 have the same structure. Thus, as long as it is unnecessary to specify the respective LEDs, the last digit of each of the reference numerals 241 to 244 is omitted in the following description, and an expression "LED 24" is used.

Figure 2:
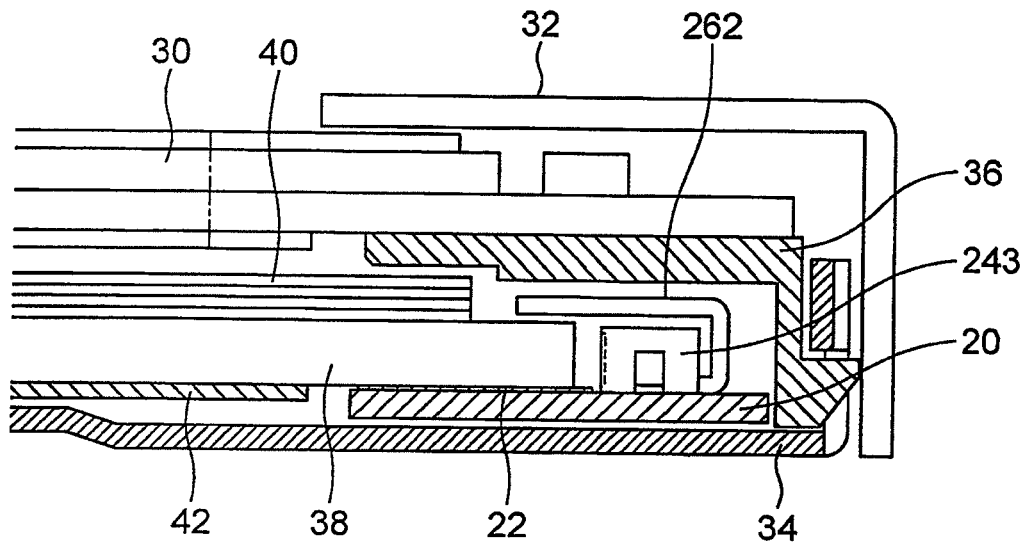
FIG. 2 is a partial sectional view of a liquid crystal display device on which the light source unit illustrated in FIG. 1 is mounted, illustrating the light source unit of FIG. 1 in cross-section taken along the line 2-2'.
Figure 3:
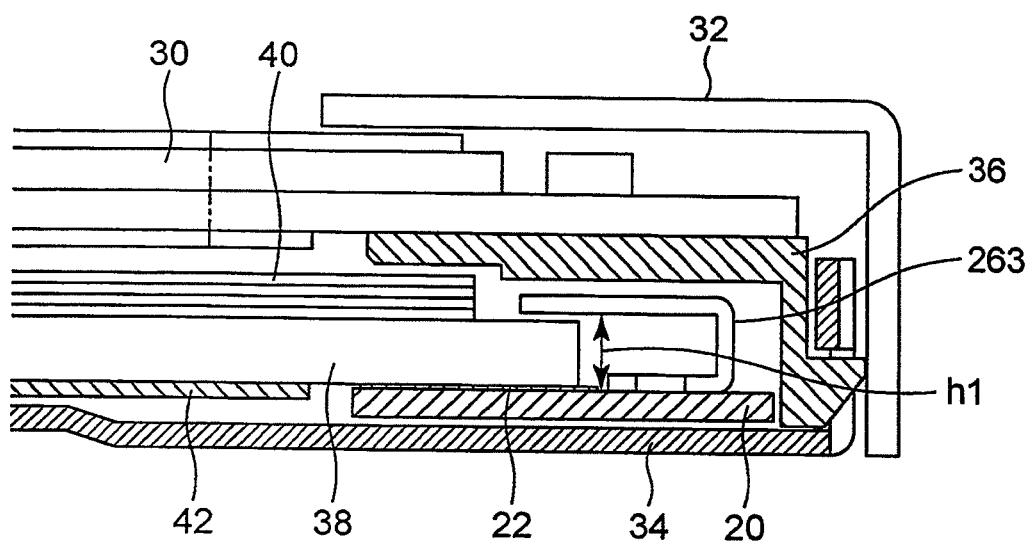
FIG. 3 is a partial sectional view of the liquid crystal display device on which the light source unit illustrated in FIG. 1 is mounted, illustrating the light source unit of FIG. 1 in cross-section taken along the line 3-3'.

FIGS. 2 and 3 illustrate a liquid crystal display device incorporating the light source unit 10 illustrated in FIG. 1. Specifically, FIG. 2 illustrates a part of the light source unit 10 cut along the line 2-2' of FIG. 1, and FIG. 3 illustrates a part of the light source unit 10 cut along the line 3-3' of FIG. 1.

The liquid crystal display device illustrated in FIGS. 2 and 3 includes a liquid crystal panel 30 and a front frame 32, and an illumination device is provided on a rear surface side of the liquid crystal panel 30. The illustrated illumination device includes a rear frame 34, a chassis 36, and a light guide plate 38. An optical sheet member 40 is provided on the liquid crystal panel 30 side of the light guide plate 38, and meanwhile, a reflective sheet 42 is formed on the rear frame 34 side of the light guide plate 38. Those members constitute a light guide member.

In FIGS. 2 and 3, the light source unit 10 illustrated in FIG. 1 is fitted in a space formed between the rear frame 34 and the chassis 36. In other words, the illumination device is configured so that the light source unit 10 illustrated in FIG. 1 is insertable and removable. Further, as illustrated in FIGS. 2 and 3, a thickness of the reflective sheet 42 provided on a rear surface of the light guide plate 38 is set to be larger than a thickness of the reflective tape 22 of the light source unit 10.

Further, each of the locating fittings 261 to 263 mounted on the substrate 20 (locating fittings 261 to 263 have the same structure, and hence are abbreviated as "locating fittings 26" in the following description) has a substantially U-shaped cross-section, and includes a first part which defines the bottom surface to be implemented on the substrate 20, a second part which extends from the first part into a perpendicular direction, and a third part which extends from the second part into a horizontal direction. The third part is longer than the first part, and defines an opening portion of the locating fitting 26 by extending to above the reflective tape 22. Further, the second part of the locating fitting 26 has a height in accordance with a thickness of the light guide plate 38. In other words, as illustrated in FIG. 3, a dimension h1 of the opening portion of the locating fitting 26 is set so that a center of a light incident surface of the light guide plate 38 and a center of the LED 24 are positioned to overlap each other as precisely as possible. In such setting, light incident efficiency with respect to the light guide plate 38 is enhanced, and hence luminance efficiency on the rear surface side of the light source unit can be enhanced.

Further, when a clearance between a thickness dimension of the light guide plate 38 and an opening dimension of the locating fitting 262 is set to a minimum, accuracy in locating the light guide plate 38 and the LED 24 is enhanced, and hence both light incident efficiency and luminance efficiency of the illumination device can be enhanced.

As illustrated in FIGS. 2 and 3, by nipping the light guide plate 38 with the locating fitting 26, the LED 24 and the light guide plate 38 can be positioned in a thickness direction. Further, at the time of assembly of the light source unit 10, the locating fitting 26 and the LED 24 can be simultaneously implemented on the substrate 20 by the automatic implementing machine, and hence the assembly can be completed in a single step. As a result, manufacturing cost can be reduced.

For fitting of the light source unit 10 illustrated in FIG. 1, an insertion port (not shown) is provided through a side surface of the illumination device. Thus, by inserting and removing the light source unit 10 structured as illustrated in FIG. 1 with respect to the illumination device, the light source unit 10 can be easily replaced.

Figure 4:
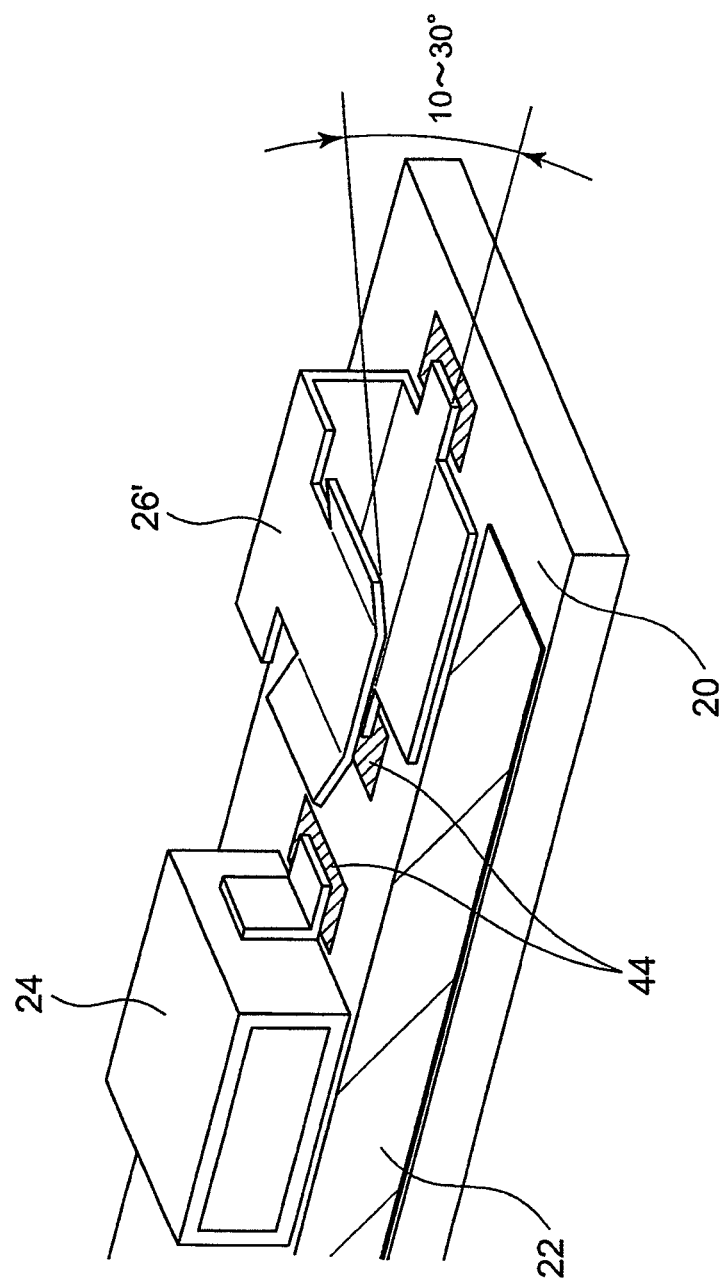
FIG. 4 is a perspective view illustrating a modification of the first embodiment of this invention.

FIG. 4 illustrates a locating fitting 26' according to a modification of this invention. At a distal end portion of the third part of the locating fitting 26' illustrated in FIG. 4, there are provided bent portions (that is, inclined portions) each having a small angle (10° to 30°) so as not to scratch the light guide plate 38 when the light source unit 10 is inserted and removed with respect to the light guide plate 38. In other words, in the modification illustrated in FIG. 4, the shape of the third part of the locating fitting 26', which protrudes above the reflective tape 22, is different from that of the locating fitting 26 illustrated in FIG. 1. Specifically, the third part of the locating fitting 26' illustrated in FIG. 4 includes a flat portion parallel to the substrate 20 and the two inclined portions on both sides of the flat portion. Each of the inclined portions is formed at an inclination angle of from 10° to 30° in a direction of being separated from the substrate 20. Those inclined portions increase properties of insertion and removal of the light source unit 10 and prevent the light guide plate 38 from being scratched by the locating fitting 26' when the light source unit 10 is inserted and removed.

Further, the LED 24 and the locating fitting 26' which are illustrated in FIG. 4 are implemented on an implementation pattern 44 on the substrate 20 by soldering.

In the first embodiment and the modification thereof illustrated in FIGS. 1 to 4, the locating fittings 26 and 26' and the LEDs 24 are implemented simultaneously with each other. Thus, it is unnecessary to assemble the locating members for the light guide plate 38 and the LEDs 24 in separate steps, and hence assembly steps can be simplified. As a result, assembly properties of the liquid crystal display device are enhanced. Further, simplification of the assembly steps leads to reduction in manufacturing cost. Thus, when the light source unit according to the first embodiment and the modification thereof is used as a light source for an illumination device or a liquid crystal display device, the light source unit simultaneously achieves advantages of being easily replaced and easily assembled. Further, the light source unit also simultaneously achieves advantages of being easily replaced and reducing manufacturing cost. Still further, the light source unit also simultaneously achieves advantages of being easily replaced and locating the light source and the light guide plate with high accuracy.

Second Embodiment

Figure 5:
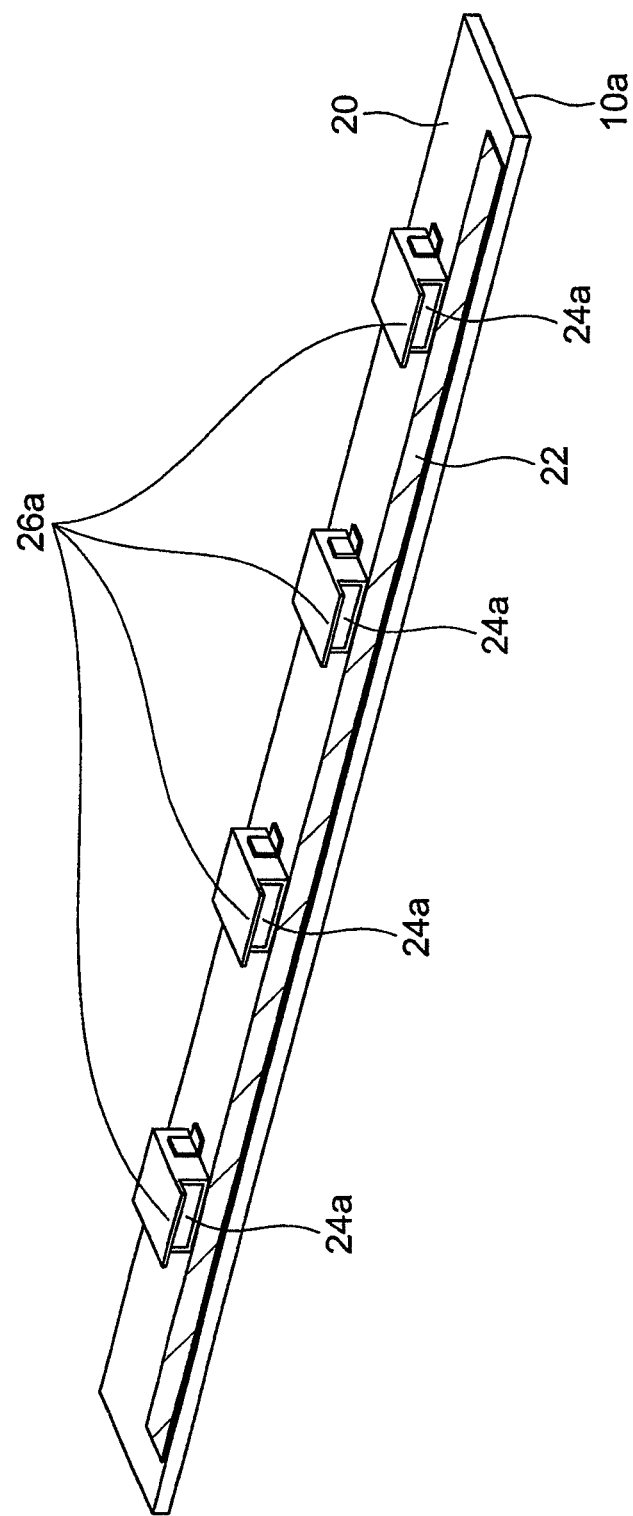
FIG. 5 is a perspective view of a light source unit according to a second embodiment of this invention.

FIG. 5 illustrates a light source unit 10a according to a second embodiment of this invention. The illustrated light source unit 10a includes a plurality of LEDs (in this case, four LEDs) 24a arranged in a line at intervals from each other on the substrate 20. A light emitting surface of each of the LEDs 24a is directed to the reflective tape 22 side. In this second embodiment, in order to function the LEDs 24a also as locating fittings, there is provided a locating protruding portion 26a formed by extending an upper surface of each of the LEDs 24a to the reflective tape 22 side. In other words, each of the illustrated LEDs 24a is an LED with a locating protrusion.

Figure 6:
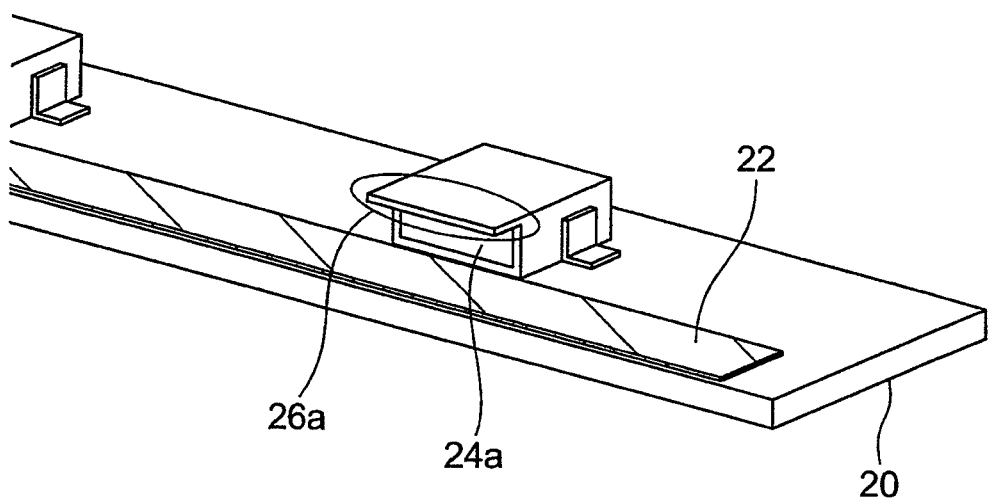
FIG. 6 is a perspective view illustrating a part of the light source unit illustrated in FIG. 5 on an enlarged scale.
Figure 7:
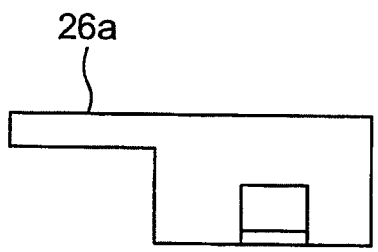
FIG. 7 is a side view of an LED used in the light source unit illustrated in FIG. 5.

Each of the LEDs 24a has a bottom surface to be mounted on the substrate 20 and both side surfaces to be implemented on implementation patterns on the substrate 20. Further, as illustrated in FIGS. 6 and 7, each of the LEDs 24a includes the locating protruding portion 26a formed by protruding the upper surface facing the bottom surface into a direction of the reflective tape 22 side.

Figure 8:
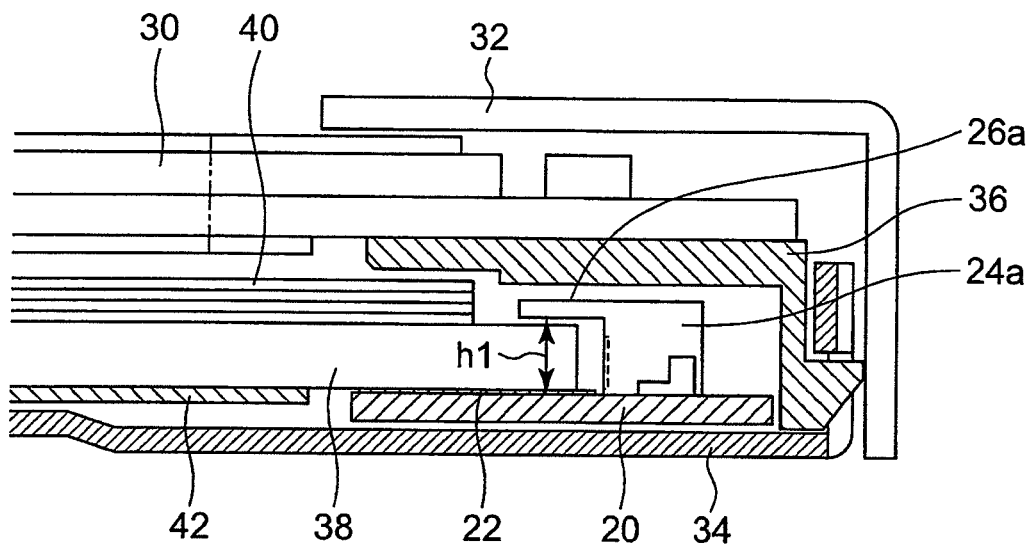
FIG. 8 is a partial sectional view of a liquid crystal display device on which the light source unit illustrated in FIG. 5 is mounted.

FIG. 8 illustrates a liquid crystal display device incorporating the light source unit 10a. The liquid crystal display device illustrated in FIG. 8 is similar to the liquid crystal display device illustrated in FIG. 2 except that the light source unit 10a illustrated in FIG. 5 is provided instead of the light source unit 10. Thus, redundant description of the same components as those in FIG. 2 is omitted. In FIG. 8, the light guide plate 38 is sandwiched between the reflective tape 22 formed on the substrate 20 and the locating protruding portion 26a having an opening portion with a dimension of h1.

In this structure, the locating protruding portion 26a for locating the light source unit 10a with respect to the light guide plate 38 is provided directly to the LED 24a, and the LED 24a thus provided with the locating protruding portion 26a is implemented on the substrate 20. Such a light source unit 10a is prepared by applying the reflective tape 22 on the substrate 20 after implementing the LED 24a with the locating protruding portion 26a.

The light source unit 10a thus prepared is mounted to the liquid crystal display device as illustrated in FIG. 8. In this case, the locating protruding portion 26a of the LED 24a is fitted to the light guide plate 38 in a manner of nipping the same. Further, it is desired that the opening dimension h1 of the locating protruding portion 26a be set so that the center of the light incident surface of the light guide plate 38 and the center of the light emitting surface of the LED 24a are positioned to overlap each other as precisely as possible. This is because, with such setting, both light incident efficiency and luminance efficiency of the backlight are enhanced.

Further, it is desired that the clearance in a thickness direction between the light guide plate and the locating protruding portion be set to a minimum. This is because, with such setting, accuracy in locating the light guide plate and the LED 24a is enhanced, and hence both light incident efficiency and luminance efficiency of the backlight are enhanced.

In the second embodiment, locating in the thickness direction can be performed by nipping the light guide plate 38 with the locating protruding portion 26a. Further, a light source can be easily replaced by inserting and removing the light source unit 10a from the insertion port provided through the side surface of the illumination device. Still further, light emitted from the LEDs 24a is sent into the light guide plate 38 by the reflective tape 22 applied on the substrate, and then radiated from an illumination surface.

Locating of the LEDs 24a with respect to the light guide plate is performed with use of the locating protruding portion 26a provided to each of the LEDs 24a, and hence positional accuracy of the light guide plate and the LEDs 24a is determined based on a dimensional tolerance between two components, specifically, the thickness of the light guide plate and outer dimensions of the LEDs. Thus, positional accuracy can be enhanced.

Further, the locating protruding portion 26a with respect to the light guide plate 38 is provided to the LED 24a, and hence it is unnecessary to assemble locating members in another step. As a result, assembly properties of the liquid crystal display device are enhanced. Still further, the separately provided locating members are not used, and hence the number of components is reduced. As a result, manufacturing cost can be reduced.

Further, similarly to the first embodiment, the following advantages can be obtained also in the second embodiment.

Specifically, the light source can be easily replaced and easily assembled, and further, manufacturing cost can be reduced. Still further, the light source and the light guide plate can be positioned with high accuracy.

Figure 9:
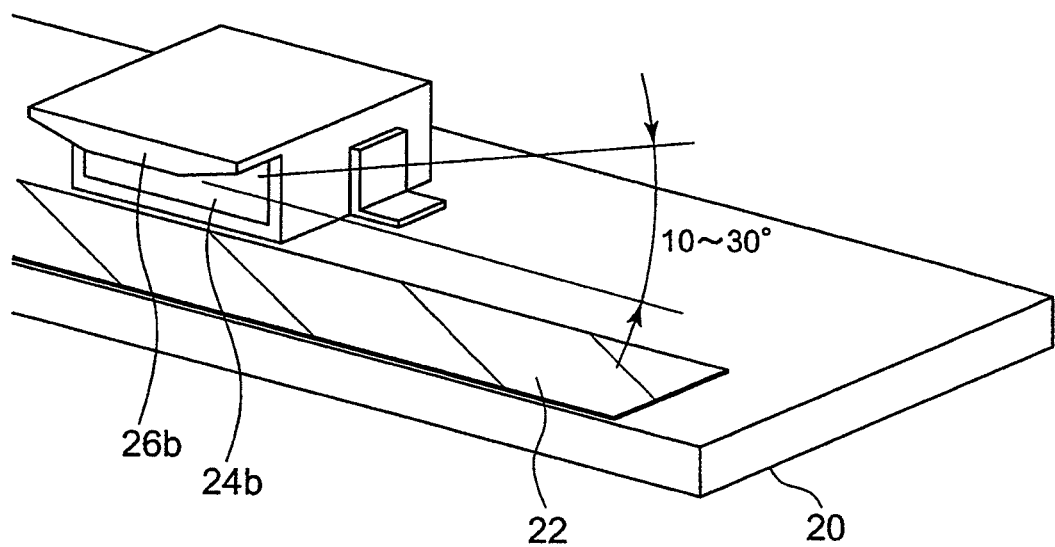
FIG. 9 is a perspective view illustrating a modification of the second embodiment of this invention.
Figure 10:
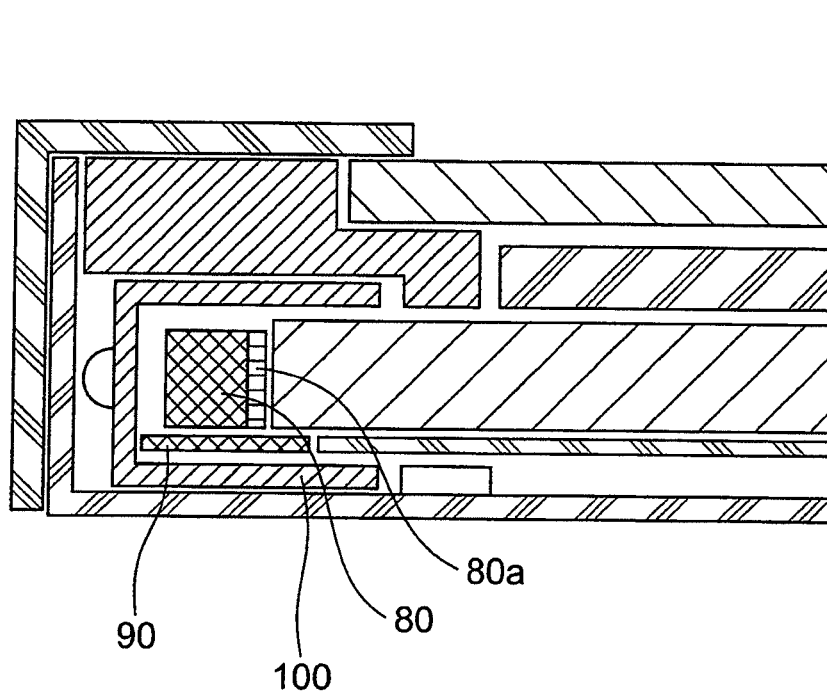
FIG. 10 is a partial sectional view illustrating an example of the liquid crystal display device according to a related art.

FIG. 9 illustrates a modification of the second embodiment of this invention. Similarly to the LEDs 24a illustrated in FIG. 5, an LED 24b illustrated in FIG. 9 includes a locating protruding portion 26b formed by extending an upper surface of the LED 24b to the reflective tape 22 side. The illustrated locating protruding portion 26b includes a third part protruding above the reflective tape 22, and two inclined portions on sides facing the reflective tape 22. In other words, the illustrated locating protruding portion 26b includes, on a surface facing the reflective tape 22 side, a flat portion parallel to the substrate 20 and the inclined portions inclined with respect to the flat portion. Each of the inclined portions is formed at an inclination angle of from 10° to 30° in a direction of being separated from the substrate 20.

As described above, by providing the inclined portions to the locating protruding portion 26b, properties of insertion and removal of the light source unit 10 can be increased, and the light guide plate 38 is prevented from being scratched by the locating protruding portion 26b when the light source unit 10 is inserted and removed.

While the invention has been particularly shown and described with reference to exemplary embodiments thereof. The invention is not limited to these embodiments. It will be understood by those of ordinary skill in the art that various changes in form and details may be made therein without departing from the spirit and scope of the present invention as defined by the claims.

What is claimed is:

1. A light source unit, comprising:
a substrate;
a light emitting portion mounted on a surface of the substrate and to be used as a light source; and
a locating component formed on the substrate and to be used for locating the light emitting portion;
wherein the light emitting portion comprises a plurality of LEDs arranged in a line at intervals from each other in a longitudinal direction of the substrate, and
wherein the locating component comprises a plurality of locating fittings arranged in the same line as the line formed of the plurality of LEDs, each of the plurality of locating fittings has a substantially U-shaped cross-section.

2. A light source unit according to claim 1, further comprising a reflective member for reflecting light from the light emitting portion, the reflective member being provided on the substrate.

3. A light source unit according to claim 1, wherein the plurality of locating fittings are respectively arranged at both ends of the plurality of LEDs arranged in the line.

4. A light source unit according to claim 3, wherein the plurality of locating fittings are respectively provided between the plurality of LEDs arranged in the line.

5. A light source unit according to claim 1, wherein each of the plurality of locating fittings having the substantially U-shaped cross-section comprises:

a first part which is mounted on the substrate;

a second part which extends perpendicularly from the first part to be mounted; and a third part which is coupled to the second part and longer than the first part.

6. A light source unit according to claim 5, wherein the second part of each of the plurality of locating fittings has a height in accordance with a thickness of a light guide member for guiding light from the plurality of LEDs.

7. A light source unit according to claim 5, wherein the third part of each of the plurality of locating fittings comprises:

a flat portion parallel to the surface of the substrate; and inclined portions continuous with the flat portion toward both sides in the longitudinal direction of the substrate, the inclined portions each being inclined in a direction of being separated from the surface of the substrate.

8. An illumination device, comprising the light source unit according to claim 1 used as a light source for the illumination device.

9. An illumination device according to claim 8, wherein the light source unit is replaceable.

10. A light source unit according to claim 1, wherein the light emitting portion comprises a plurality of LEDs arranged in a line at intervals from each other in a longitudinal direction of the substrate, and wherein the locating component is fitted integrally with each of the plurality of LEDs.

11. A light source unit according to claim 10, wherein the locating component comprises a protruding portion extending from an upper surface of each of the plurality of LEDs beyond a light emitting surface of each of the plurality of LEDs.

12. A light source unit according to claim 11, wherein the protruding portion comprises:

a flat portion parallel to the surface of the substrate; and inclined portions continuous with the flat portion toward both sides in the longitudinal direction of the substrate, the inclined portions each being inclined in a direction of being separated from the surface of the substrate.

13. A liquid crystal display device, comprising the light source unit according to claim 1 used as a light source for the liquid crystal display device.

14. A liquid crystal display device according to claim 13, wherein the light source unit is replaceable.

\* \* \* \* \*